United States Patent
Lyons

[19]

[11] Patent Number: 5,950,752
[45] Date of Patent: Sep. 14, 1999

[54] HEATING SYSTEM FOR A HYBRID ELECTRIC VEHICLE

[75] Inventor: Arthur Paull Lyons, Maine, N.Y.

[73] Assignee: Lockheed Martin Corp., Johnson City, N.Y.

[21] Appl. No.: 09/039,896

[22] Filed: Mar. 16, 1998

Related U.S. Application Data

[60] Provisional application No. 60/066,735, Nov. 21, 1997.

[51] Int. Cl.$^6$ ........................................... B60H 1/16
[52] U.S. Cl. .......................... 180/65.2; 165/41; 318/599; 180/65.4; 237/28
[58] Field of Search ..................... 237/5, 12.3 A, 237/12.3 R, 28; 165/41, 104.22; 180/65.1, 65.2, 65.3, 65.4, 65.8, 68.2; 318/599, 606, 607

[56] References Cited

U.S. PATENT DOCUMENTS

| | | | |
|---|---|---|---|
| 4,331,209 | 5/1982 | Bauer et al. ............................ | 180/65.1 |
| 4,364,444 | 12/1982 | Donato et al. .......................... | 180/65.1 |
| 5,089,761 | 2/1992 | Nakazawa ............................ | 318/599 X |
| 5,251,588 | 10/1993 | Tsujii et al. ......................... | 180/65.4 X |
| 5,255,733 | 10/1993 | King ....................................... | 165/41 X |
| 5,739,664 | 4/1998 | Deng et al. .......................... | 318/599 X |
| 5,850,132 | 12/1998 | Garces ..................................... | 318/599 |

*Primary Examiner*—J. J. Swann
*Assistant Examiner*—Michael Mar
*Attorney, Agent, or Firm*—W. H. Meise; G. H. Krauss

[57] ABSTRACT

A hybrid electric vehicle includes a traction motor driven by a traction battery, and a supplemental or secondary electrical source for charging the traction battery. In order to warm the passenger compartment during cold weather, heat is applied from the traction motor and the secondary source. Under some conditions, there may be insufficient heat to adequately warm the passenger compartment. The traction motor efficiency is lowered, so that more heat is generated, to aid in supplying the deficiency. In an embodiment in which the traction motor is an ac motor, the efficiency is lowered by applying a direct current to the motor. In an embodiment in which the ac motor is an induction motor, the efficiency is lowered by increasing the average slip frequency.

4 Claims, 4 Drawing Sheets

HEATING SYSTEM FOR A HYBRID ELECTRIC VEHICLE

This patent applications claims priority of Provisional patent application Ser. No. 60/066,735 filed Nov. 21, 1997.

FIELD OF THE INVENTION

This invention relates to hybrid electric vehicles which include both electric motors and fuel-consuming electrical generators, and more particularly to such vehicles which provide heaters for passenger comfort.

BACKGROUND OF THE INVENTION

Hybrid electric vehicles are widely viewed as being among the most practical of the low-polluting vehicles. A hybrid electric vehicle includes an electric "traction" battery which provides electric power for an electric traction motor, which in turn drives the wheels of the vehicle. The "hybrid" aspect of a hybrid electric vehicle lies in the use of a secondary or supplemental source of electrical energy for recharging the traction battery during operation of the vehicle. This secondary source of electrical energy may be solar panels, a fuel cell, a generator driven by an internal combustion engine, or generally any other source of electrical energy. When an internal combustion engine is used as the secondary source of electrical power, it commonly is a relatively small engine which uses little fuel, and produces little pollution. A concomitant advantage is that such a small internal combustion engine can be operated within a limited RPM range, so that pollution controls of the engine may be optimized. The terms "primary" and "secondary" when used to describe the sources of electrical energy merely relate to the way energy is distributed during operation, and are not of fundamental importance to the invention. A simple electrically driven vehicle powered only by electrical batteries has the disadvantages that the batteries may become depleted while the vehicle is far from a battery charging station, and even when such a vehicle successfully returns to its depot after a day's use, the batteries must then be recharged. The hybrid electric vehicle has the significant advantage over a simple electrically powered vehicle that the hybrid electric vehicle recharges its own batteries during operation, and so should not ordinarily require any external battery charging. Thus, the hybrid electric vehicle can be used much like an ordinary vehicle powered by internal combustion engines, requiring only replenishing of the fuel. Another major advantage of the hybrid electric vehicle is its good fuel mileage. The advantage in fuel mileage arises from the use of regenerative dynamic braking, which converts kinetic energy of motion into electrical power during at least a portion of braking, and returns the energy to the battery. It has been found that braking losses account for somewhere near half of all the frictional losses experienced by a vehicle in an urban transit setting. The recovery of this 50% of energy, and returning it to the batteries for reuse, permits the use of a much smaller "secondary" fuel-operated electrical generator than would be the case if regenerative braking were not used. In turn, the smaller secondary electrical source results in less fuel used per unit time, or per mile. Yet another advantage of a hybrid electric vehicle is that under many conditions, the power which is available for accelerating the vehicle is the sum of the maximum power which can be supplied by the batteries plus the maximum power which can be generated by the secondary electrical generator. When the electrical generator is a diesel-powered internal combustion engine, the combination of the battery power and the diesel power can result in a total motive force which is quite substantial, notwithstanding the good fuel mileage.

While hybrid electric vehicles are economically and environmentally advantageous, they must be somewhat "foolproof", in that they must be similar to conventional internal-combustion-powered vehicles, both in their operation and in their responses to operator input, in order to achieve widespread acceptance.

SUMMARY OF THE INVENTION

A hybrid electric vehicle includes a mechanical drive arrangement for moving the vehicle in response to mechanical drive. An electric traction motor is coupled to the mechanical drive arrangement, for, when energized, mechanically driving the mechanical drive arrangement, to thereby drive the vehicle. The vehicle also includes a store of electrical energy (which may be a traction battery), and a controller coupled to the store of electrical energy and to the traction motor, for controllably energizing the traction motor. The energization of the traction motor causes mechanical drive of the mechanical drive arrangement. The vehicle carries fuel, as in a tank. A controllable source of electrical energy, such as a fuel cell or an internal combustion engine/electric generator, is coupled to the source of fuel, and to at least the controller, for using the fuel to generate electrical energy for either driving the traction motor, storage in the store of electrical energy, or both. As a result of operation of the source of electrical energy and the traction motor, heat is unavoidably generated. The vehicle includes a passenger compartment, and a heat exchanger coupled to the passenger compartment, to the source of electrical energy, and to the traction motor, for controllably coupling the heat to the passenger compartment, in order to maintain the passenger compartment comfortably warm. During cold weather, the heat generated by the source of electrical energy and the traction motor may be insufficient to maintain a comfortable temperature in the passenger compartment. A control arrangement is associated with the controller, for operating the traction motor in a first state defining a first range of efficiencies, and for, when necessary to maintain the comfortable temperature in the passenger compartment, operating the traction motor in a second state having a range of efficiencies which is lower than the range of efficiencies of the first state, for thereby generating more heat from the traction motor, which additional heat can be made available to the passenger compartment.

In one embodiment of the invention, the traction motor is an ac motor, and the controller includes a dc-to-ac inverter coupled to the battery and to the ac motor, for controllably converting the direct voltage into alternating-current drive for the ac motor. The control arrangement in this embodiment includes a direct current control arrangement for, in the second state, causing a significant direct current to flow through the ac motor.

In another embodiment of the invention, the store of electrical energy includes an electrical battery for producing direct voltage, and the traction motor is an ac induction motor. In this embodiment, the controller includes a dc-to-ac inverter coupled to the battery and to the ac motor, for controllably converting the direct voltage into variable-frequency alternating-current drive for the ac motor, whereby in the first operating state the induction motor rotates at a frequency which is less than the frequency of the alternating-current drive by a first range of slip frequencies. In this embodiment, the control arrangement includes an arrangement for operating in a second operating state, in which the slip frequencies occupy a second range, in which the highest frequencies are greater than the highest frequencies of the first range.

In another embodiment of the invention, the vehicle includes an electric traction motor for, when energized, driving the vehicle, and also includes a store of electrical direct voltage, such as a battery. A controller is coupled to the store of direct voltage and to the traction motor, The controller includes a dc-to-ac inverter, for controllably generating alternating voltage for driving the traction motor. The dc-to-ac inverter generates heat during operation. The vehicle also includes a passenger compartment, and a fluidic heat transfer arrangement coupled to the passenger compartment and to the inverter, for coupling at least some of the heat from the inverter to the passenger compartment.

DESCRIPTION OF THE INVENTION

Figure 1:
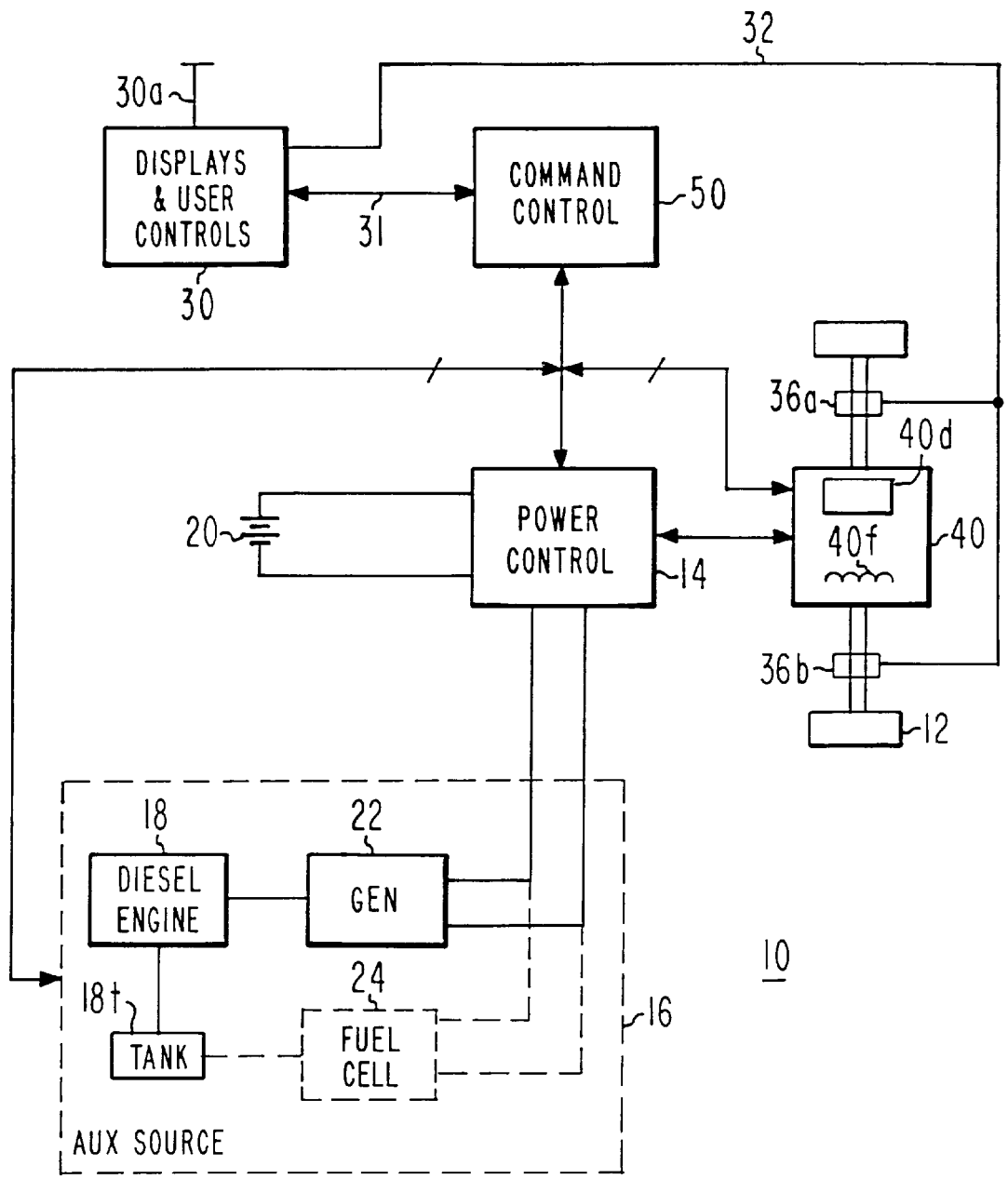
FIG. 1 is a simplified block diagram of an electric vehicle according to an aspect of the invention, including a command controller which performs control in accordance with the invention, and also including a power controller.

In FIG. 1, an electric vehicle 10 includes at least one drive wheel 12 connected by a gearbox 40d to an alternating voltage electric traction motor 40, which in one embodiment of the invention is a three-phase alternating-current motor. Motor 40 is preferably a motor-generator, as known, so that kinetic energy of motion can be transduced into electrical energy during dynamic braking. A power controller 14 is connected by power-handling paths to traction motor 40, to a traction battery illustrated as 20, and to an auxiliary or secondary source of electrical energy illustrated as a block 16. As illustrated in block 16, the auxiliary source may include an internal combustion engine such as a diesel engine 18 driving an electrical generator 22, or it may include a fuel cell 24, either using fuel from a tank 18t. A command controller illustrated as a block 50 is connected by means of information paths to power controller 14, auxiliary source 16, and to traction motor 40, for controlling the operation of the power controller 14, auxiliary source 16, and to traction motor 40 in accordance with appropriate control laws preprogrammed into command controller 50.

One of the most common and least expensive types of batteries which is capable of storing relatively high power includes the common lead/$H_2SO_4$ battery. This type of battery, with a gel-type electrolyte for safety purposed, is suitable for use in an electric vehicle, if some care is taken to prevent application of a charging current thereto when the battery is at full charge, to prevent gassing of the electrolyte and undesired heat generation, and if sulfation can be avoided. Two Patent applications Ser. Nos. 08/961,571 and 08/961,573, filed Oct. 30, 1997 in the name of Hoffman, Jr. and Grewe, now U.S. Pat. Nos. 5,869,950 and 5,828,201 respectively and entitled METHOD FOR EQUALIZING THE VOLTAGE OF TRACTION BATTERY MODULES OF A HYBRID ELECTRIC VEHICLE and METHOD FOR MAINTAINING THE CHARGE CAPACITY OF TRACTION BATTERY MODULES OF A HYBRID ELECTRIC VEHICLE, respectively, describe control arrangements by which lead-acid batteries can be maintained to optimize their useful life and capacity, and describe various aspects of the care and use of such batteries.

In FIG. 1, the displays and operator controls of vehicle 10 are illustrated as a block 30. Block 30 is illustrated as being connected by a bidirectional data path 31 to command control block 50, for applying driving commands to command controller 50, which command controller 50 can then convert into appropriate commands to the various power elements, such as power controller 14, auxiliary source 16, and traction motor 40. Block 30 is also illustrated as being connected by a path 32 to friction brakes 36a and 36b, for direct control of the friction brakes by a conventional hydraulic braking system connected to a brake pedal 30a.

Figure 2:
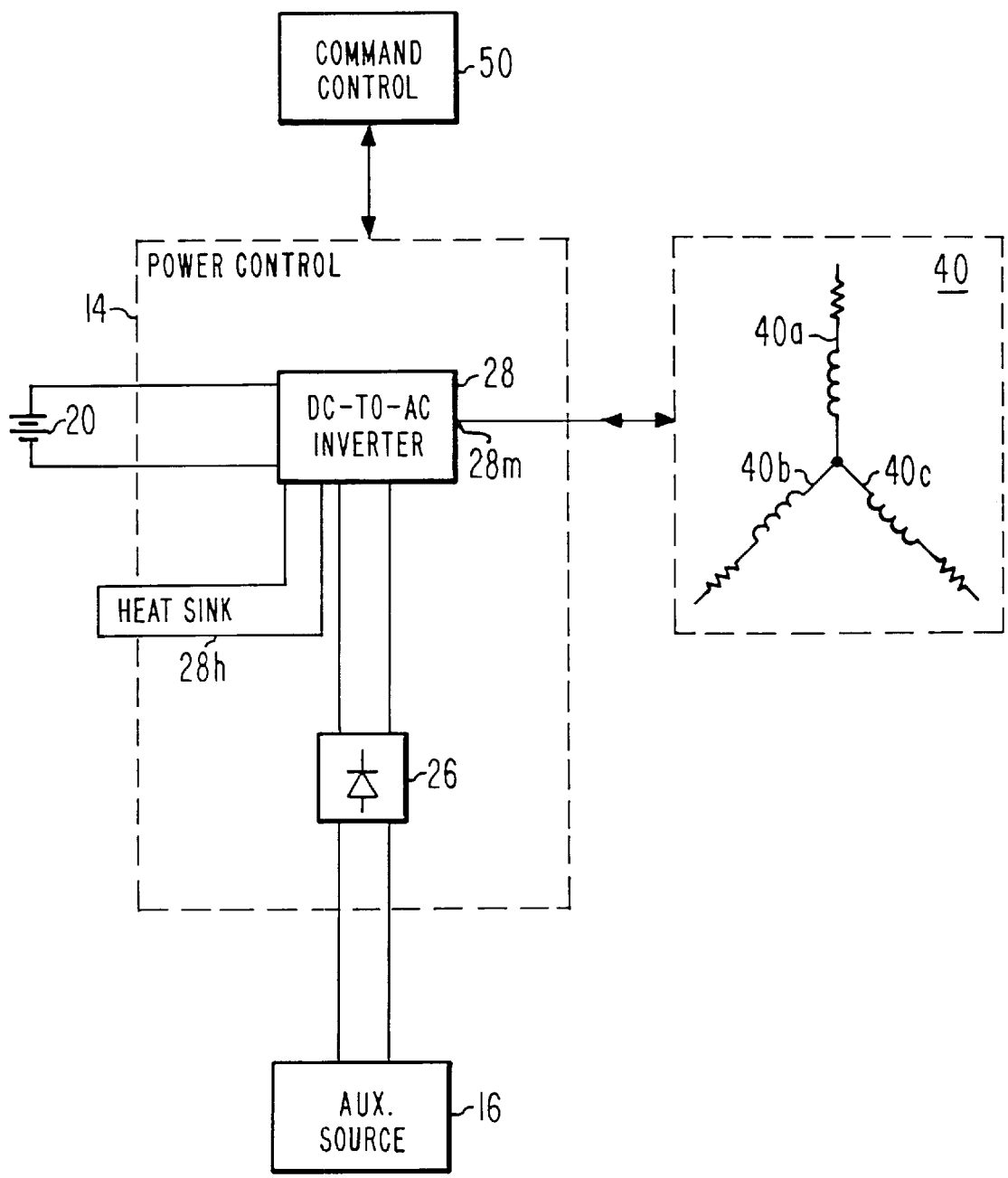
FIG. 2 is a simplified block diagram illustrating some details of the power controller of FIG. 1.

FIG. 2 represents the interconnection of some of the elements of power controller 14 of FIG. 1 with other elements of FIG. 1. More particularly, power controller 14 includes a rectifier arrangement 26 connected to auxiliary source 16, for (if necessary) converting the alternating-current output of the auxiliary source 16 into direct voltage. Power controller 14 also includes a bidirectional dc-to-ac inverter 28 coupled by power connections to battery 20, to rectifier arrangement 26, and to traction motor 40. At least the power switches of inverter 28 are coupled to a heat sink 28h, for carrying heat from the switches to maintain reliability. The operations of the inverter 28, the auxiliary source 16, and traction motor 40 are controlled, as mentioned above, by command controller 50.

In basic operation of the arrangement of FIGS. 1 and 2, the command controller (50) controls the individual switches (not illustrated) of inverter 28 with switched pulse-width commands, which result in the generation, at that port 28m of the inverter 28 which is coupled to the traction motor 40, of a quantized approximation of an alternating voltage having a selected frequency and magnitude. The frequency and magnitude of the commanded alternating current drive to the traction motor 40 are selected to drive the motor with a selected traction current at a selected motor speed. In general, traction motor 40 produces a back EMF which increases with increasing motor speed, and the inverter must produce (under the control of command controller 50) an increasing alternating voltage at higher frequencies in order to maintain the same traction motor drive current.

The motor rotates at a frequency consistent with the commanded frequency of the inverter output. Also in basic operation of an electric vehicle such as that of FIGS. 1 and 2, both dynamic braking and friction braking may be performed. The dynamic braking is much preferred, as kinetic energy of motion is recaptured as the vehicle slows by the traction motor operating as an electric generator. During those intervals in which dynamic braking occurs, the dc-to-ac inverter 28 of FIG. 2, operating in a second or regenerating direction, converts the alternating voltage produced by the traction motor 40 into a direct voltage which charges traction battery 20. Further, when the electric vehicle is a hybrid electric vehicle, including the auxiliary electric source 16, the auxiliary source can be operated during operation of the vehicle to replenish the batteries and or to provide some of the traction energy, depending upon the commands of command controller 50.

It should be noted that the controller 50 of FIGS. 1 and 2 performs many other control functions appropriate to operation of vehicle 10. Among these control functions is that of making minor adjustments of the frequency of pulse-width modulated power switch waveforms produced by inverter 28. As mentioned, inverter 28 is controlled by recurrent drive pulses, having a rate of recurrence which is much higher than the frequency of the waveform being generated, and the widths or durations of which are controlled in order to establish the instantaneous magnitude of the waveform being created. In order to maximize the operating efficiency of the traction motor, controller 50 also perturbs the rate of recurrence of the drive pulses so that an integer number of the drive pulses is generated during each cycle of the waveform being created. The integer number of cycles, in turn, aids in preventing generation of an output voltage waveform having a direct-voltage component, which might tend to reduce the efficiency of the traction motor.

Figure 3:
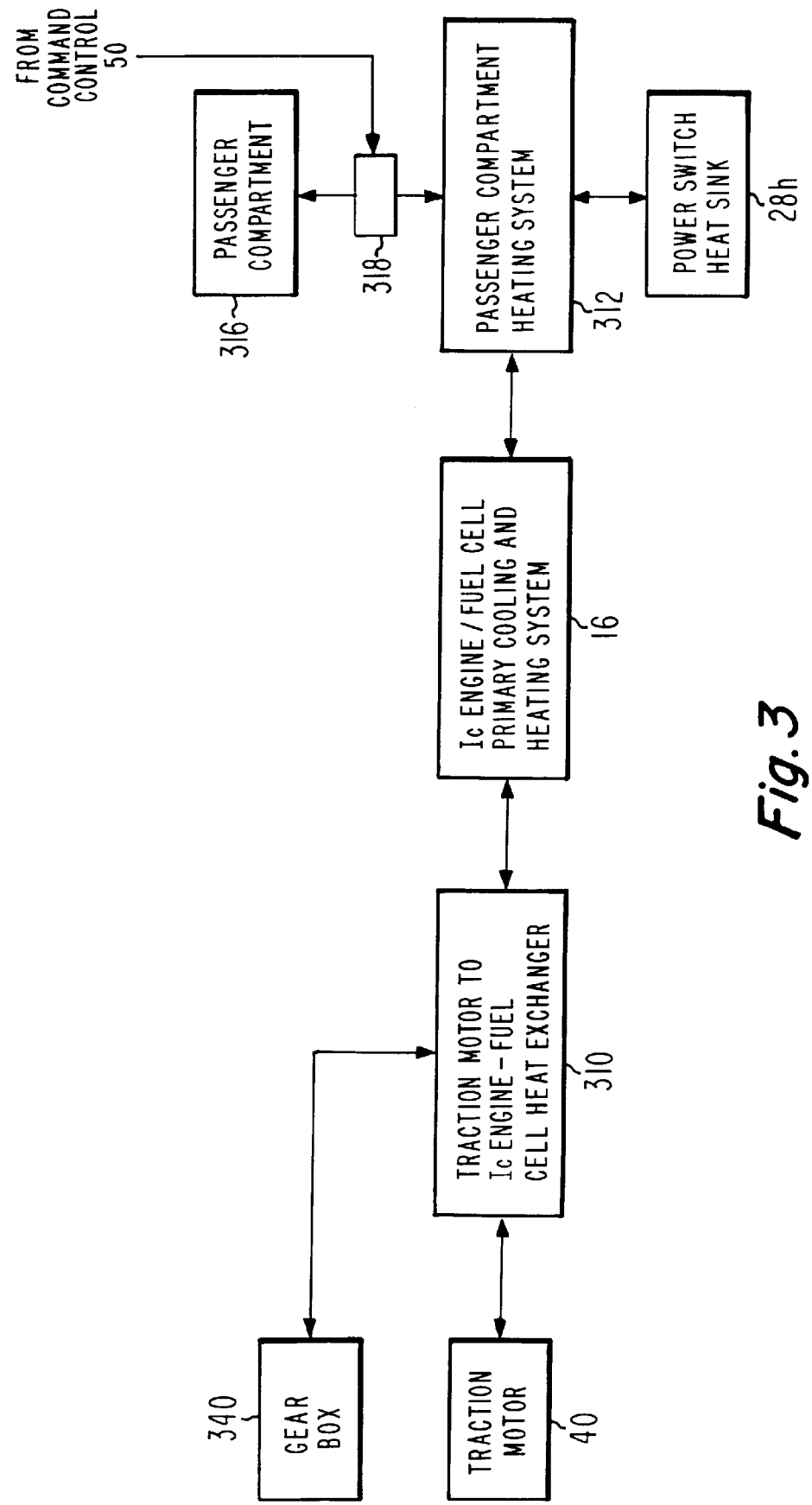
FIG. 3 is a simplified block diagram of a thermal control system in accordance with an aspect of the invention.

FIG. 3 is a simplified block diagram of the heat transfer system of the vehicle 10 of FIG. 1. In FIG. 3, the traction motor is thermally coupled to a first heat exchanger 310, and the auxiliary electrical source 16 is also coupled to heat exchanger 310. Since heat flows bidirectionally in such paths, depending on the location of the highest temperature, it is clear that the traction motor 40 and the auxiliary source 16 are thermally coupled by first heat exchanger 310. Similarly, electrical auxiliary source 16 is thermally coupled by way of a second heat exchanger 312 to the passenger compartment, illustrated as a block 316, possibly by way of a controlled valve, illustrated as a block 318, which is controlled by command controller 50 of FIG. 1. In addition, a gearbox associated with traction motor 40 of FIG. 1 is illustrated as a block 340 in FIG. 3. Gearbox 340 is illustrated as being coupled to first heat exchanger 310. Another source of heat in the hybrid electric vehicle is the dc-to-ac inverter 28 of FIG. 2; its heat sink 28$h$ is illustrated in FIG. 3 as being thermally coupled to second heat exchanger 312. The elements 16, 28$h$, 40, 310, 312, and 340 of FIG. 3 are thermally coupled, and, if there is sufficient heat flow in the various paths, should tend toward the same temperature. Together, elements 16, 28$h$, 49, 310, 312, and 340 of FIG. 3 form a heat source which can be coupled to passenger compartment 316. Command controller 50 senses the temperature of the passenger compartment (by means not illustrated), and controls valve 318 in a feedback manner, as known, in order to maintain a selected temperature. It should be noted that in a preferred embodiment of the invention, at least one of the heat exchangers uses oil as the circulating heat transfer fluid. The system of FIG. 3 includes a radiator (not illustrated) coupled to heat exchanger 310 for heat rejection from the entire system.

Due to the relatively high efficiency of the hybrid electric vehicle, there may be insufficient heat generation in the combination of the auxiliary source 16, the traction motor 40, and the gearbox 340, to sufficiently heat the passenger compartment 316 during especially cold weather. It might be possible to provide a separate fuel-burning heater for such conditions, but this requires additional equipment which is used only occasionally, and the additional weight of such equipment would have to be carried during warmer-weather operation of the vehicle, thereby occasioning a reduction in fuel economy. According to an aspect of the invention, the command controller assumes a first operating state as described above under normal operating conditions. When the weather is cold, and the amount of heat produced by the various power devices is insufficient, the command controller determines the existence of a need for additional heat, and the system enters a second operating condition, in which the command controller reduces the efficiency of the traction motor during such periods, in order to generate the additional heat. In any particular operating state of the traction motor, its efficiency may be expected to vary in accordance with environmental conditions, and with speed and load. The range of efficiencies in the high-efficiency operating state may be expected to extend to higher values of efficiency, and the range of efficiencies to be expected during operation in a low-efficiency condition should have values of efficiency lower than the least efficiency in the high-efficiency condition, but it should be realized that there may be overlap of the ranges of efficiency.

More particularly, in one embodiment of the invention, the command controller 50 of FIGS. 1 and 2, upon determining the need for additional heat generation, (a) adjusts the drive of inverter 28 in a manner which reduces or eliminates the adjustment of the inverter switch drive frequency to produce integer numbers of drive waveforms in each half-cycle of the alternating voltage output waveform, or (b) positively readjusts the number of drive pulses in each half-cycle of the output voltage waveform to a non-integer value. Consequently, in the second operating state, a non-integer number of pulse-width modulated power switch drive pulses are produced by the command controller during each half-cycle of the inverter output voltage waveform. This non-integer number of drive pulses in each half-cycle of the output voltage waveform, in turn, tends to produce an average direct current through the motor. The direct-current component of the total motor current reduces the efficiency due to interaction between the direct and alternating fields, and results in more heat generation. In effect, the motor draws more alternating electrical current in the second, low-efficiency state, over and above the alternating current required to provide the commanded motive force, and this additional current is converted into heat, which is ultimately made available to the passenger compartment.

In another embodiment of the invention, the traction motor 40 of FIGS. 1, 2, and 3 is an ac induction motor. Those skilled in the art know that such induction motors have a speed or frequency of rotation which is less than the frequency of rotation of the magnetic fields of the stator by a difference frequency known as a "slip" frequency. The slip frequency is determined by the load on the induction motor; slip increases as the load increases. According to an aspect of the invention, command controller 50, when it identifies a need for entering the second operating state, increases the slip frequency of the traction motor. This is accomplished by simply increasing the frequency of the alternating-voltage drive applied to the stator of the motor. Increasing the slip frequency tends to decrease motor efficiency, thereby resulting in generation of more heat than at a smaller slip frequency.

Figure 4:
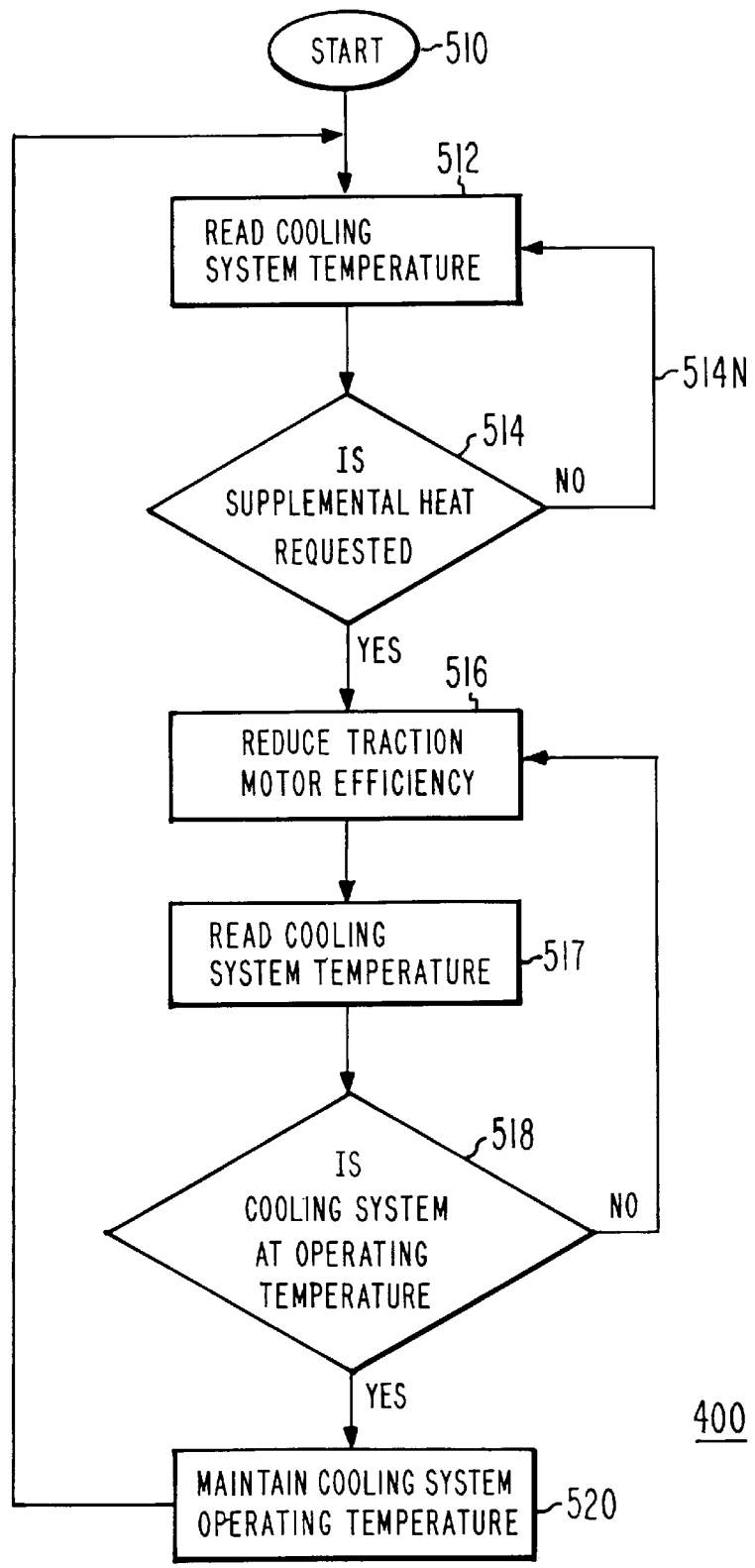
FIG. 4 is a simplified flow chart illustrating logic performed by the command controller of FIGS. 1 and 2 to determine the proper operating mode, and to set the motor efficiency.

FIG. 4 is a simplified flow chart illustrating the logic flow in the command controller for determining the need to be in a first, high-motor-efficiency mode of operation or a second, lower-motor-efficiency mode of operation. In FIG. 4, the logic starts at a START block 510, and flows to a further logic block 512, which represents the reading of the cooling system temperature. From block 512, the logic flows to a decision block 514, which determines if supplemental heat is requested. If supplemental heat is not requested, the logic leaves decision block 514 by the NO output, and returns by way of a logic path 514N to block 512. At vehicle start-up, or under cold conditions, supplemental heat may be requested, so the logic leaves decision block 514 by the YES output, and arrives at a further block 516, which represents reduction in the efficiency of the traction motor. From block 516, the logic flows by way of a block 517, representing reading of the cooling system temperature, to a further decision block 518, which compares the cooling system temperature with a preset standard, which may be variable by the vehicle operator. If the temperature of the cooling system is not at its normal operating temperature, the logic leaves decision block 518 by the NO path, and proceeds back to block 516, to continue the low-efficiency operation. On the other hand, if decision block 518 finds that the cooling system is at its proper operating temperature, the logic exits by the YES output, and proceeds to a block 520, which represents maintenance of the normal or high efficiency operating state of the cooling system.

Other embodiments of the invention will be apparent to those skilled in the art. For example, while a valve 318 has been illustrated as being used to control the flow of heat to passenger compartment 316, a flow diverter or other device could be used. While the temperature has been described as being under the control of a feedback system, the control could be open-loop control, as for example control of valve 318 of FIG. 3 by a vehicle operator, as is common in present-day automobiles. While the arrangement of FIG. 3 uses two separate heat exchangers 310 and 312, they are thermally coupled, and it is apparent that they may be combined into a single unit if appropriate, or that more than two heat exchangers may be used if desired.

Thus, a hybrid electric vehicle (10) according to an aspect of the invention includes a mechanical drive arrangement (40d, 12) for moving the vehicle (10) in response to mechanical drive. An electric traction motor (40) is coupled to the mechanical drive arrangement (40d, 12), for, when energized, mechanically driving the mechanical drive arrangement (40d, 12), to thereby drive the vehicle (10). The vehicle (10) also includes a store (20) of electrical energy (which may be a traction battery), and a controller (14, 50) coupled to the store (20) of electrical energy and to the traction motor (40), for controllably energizing the traction motor (40). The energization of the traction motor (40) causes mechanical drive of the mechanical drive arrangement. The vehicle (10) carries fuel, as in a tank (18t). A controllable source (16) of electrical energy, such as a fuel cell (24) or an internal combustion engine/electric generator (18, 22), is coupled to the source of fuel (18t), and to at least the controller (14, 50), for using the fuel to generate electrical energy for either driving the traction motor (40), storage in the store (20) of electrical energy, or both. As a result of operation of the source (20) of electrical energy and the traction motor (40), heat is unavoidably generated. The vehicle (10) includes a passenger compartment (316), and a heat exchanger (310, 312) coupled to the passenger compartment (316), to the source (20) of electrical energy, and to the traction motor (40), for controllably coupling the heat to the passenger compartment (316), in order to maintain the passenger compartment comfortably (316) warm. During cold weather, the heat generated by the source (20) of electrical energy and the traction motor (40) may be insufficient to maintain a comfortable temperature in the passenger compartment (316). A control arrangement (400) is associated with the controller (14, 50), for operating the traction motor (40) in a first state defining a first range of efficiencies, and for, when necessary to maintain the comfortable temperature in the passenger compartment, operating the traction motor (40) in a second state having a range of efficiencies which is lower than the range of efficiencies of the first state, for thereby generating more heat from the traction motor (40), which additional heat can be made available to the passenger compartment (316).

In one embodiment of the invention, the traction motor (40) is an ac motor, and the controller (14, 50) includes a dc-to-ac inverter (28) coupled to the battery (20) and to the ac motor (40), for controllably converting the direct voltage into alternating-current drive for the ac motor (40). The control arrangement (14, 50) in this embodiment includes a direct current control arrangement for, in the second state, causing a significant direct current to flow through the ac motor.

In another embodiment of the invention, the store (20) of electrical energy includes an electrical battery (20) for producing direct voltage, and the traction motor (40) is an ac induction motor. In this embodiment, the controller (14, 50) includes a dc-to-ac inverter (28) coupled to the battery (20) and to the ac motor (40), for controllably converting the direct voltage into variable-frequency alternating-current drive for the ac motor (40), whereby in the first operating state the induction motor (40) rotates at a frequency which is less than the frequency of the alternating-current drive by a first range of slip frequencies. In this embodiment, the control arrangement (14, 50) includes an arrangement (400) for operating in a second operating state, in which the slip frequencies occupy a second range, in which the highest frequencies are greater than the highest frequencies of the first range.

In another embodiment of the invention, the vehicle (10) includes an electric traction motor (40) for, when energized, driving the vehicle (10), and also includes a store (20) of electrical direct voltage, such as a battery. A controller (14, 50) is coupled to the store (20) of direct voltage and to the traction motor (40), The controller (14, 50) includes a dc-to-ac inverter (28), for controllably generating alternating voltage for driving the traction motor (40). The dc-to-ac inverter (28) generates heat during operation. The vehicle (10) also includes a passenger compartment (316), and a fluidic heat transfer arrangement (310, 312) coupled to the passenger compartment (316) and to the inverter (28), for coupling at least some of the heat from the inverter (28) to the passenger compartment (316).

What is claimed is:

1. A hybrid electric vehicle, comprising:
   a passenger compartment;
   a mechanical drive arrangement for moving said vehicle in response to mechanical drive;
   an ac traction motor coupled to said mechanical drive arrangement, for, when energized, mechanically driving said mechanical drive arrangement to thereby drive said vehicle;
   a store of electrical energy including an electrical battery for producing direct voltage;
   a controller coupled to said store of electrical energy and to said traction motor, for controllably energizing said traction motor, for thereby causing said mechanical drive of said mechanical drive arrangement, said controller including a dc-to-ac inverter coupled to said battery and to said ac motor, for controllably converting said direct voltage into alternating voltage for said ac motor;
   a source of fuel:
      a controllable source of electrical energy coupled to said source of fuel, and to at least said controller, for using said fuel to generate electrical energy for at least one of driving said traction motor and storage in said store of electrical energy;
      whereby operation of said source of electrical energy and said traction motor unavoidably results in generation of heat;
      heat exchanging means coupled to said passenger compartment, to said source of electrical energy, and to said traction motor, for controllably coupling said heat to said passenger compartment;

whereby during cold weather said heat generated by said source of electrical energy and said traction motor may be insufficient to maintain a comfortable temperature in said passenger compartment; and control means associated with said controller, for operating said traction motor in a first state defining a first range of efficiencies, and for sensing said temperature of said passenger compartment, and for, when necessary to maintain said comfortable temperature, operating said traction motor in a second state having a range of efficiencies which is lower than said range of efficiencies in said first state, for thereby generating more heat from said traction motor, which can be made available to said passenger compartment, said control means including means for causing a significant amount of direct voltage to flow through said ac motor in said second state.

2. A hybrid electric vehicle, comprising:

a passenger compartment;

a mechanical drive arrangement for moving said vehicle in response to mechanical drive;

an ac induction traction motor coupled to said mechanical drive arrangement, for, when energized, mechanically driving said mechanical drive arrangement to thereby drive said vehicle;

a store of electrical energy including an electrical battery for producing direct voltage;

a controller coupled to said store of electrical energy and to said traction motor, for controllably energizing said traction motor, for thereby causing said mechanical drive of said mechanical drive arrangement;

a source of fuel:

a controllable source of electrical energy coupled to said source of fuel, and to at least said controller, for using said fuel to generate electrical energy for at least one of driving said traction motor and storage in said store of electrical energy;

whereby operation of said source of electrical energy and said traction motor unavoidably results in generation of heat;

heat exchanging means coupled to said passenger compartment, to said source of electrical energy, and to said traction motor, for controllably coupling said heat to said passenger compartment;

whereby during cold weather said heat generated by said source of electrical energy and said traction motor may be insufficient to maintain a comfortable temperature in said passenger compartment; and control means associated with said controller, for operating said traction motor in a first state defining a first range of efficiencies, and for sensing said temperature of said passenger compartment, and for, when necessary to maintain said comfortable temperature, operating said traction motor in a second state having a range of efficiencies which is lower than said range of efficiencies in said first state, for thereby generating more heat from said traction motor, which can be made available to said passenger compartment;

said controller including a dc-to-ac inverter coupled to said battery and to said traction motor, for controllably converting said direct voltage into variable-frequency alternating voltage for energizing said traction motor, whereby in said first operating state said traction motor rotates at a frequency which is less than the frequency of alternating voltage drive by a first range of slip frequencies; and said control means including means for operating in said second operating state in which said slip frequencies occupy a second range and in which the highest frequencies are greater than the highest frequencies of said first range.

3. A method for operating a hybrid electric vehicle having a passenger compartment, said method comprising the steps of:

providing a battery on said vehicle:

providing a fuel container on said vehicle;

on said vehicle, operating one of a fuel cell and an internal-combustion-engine/generator using fuel from said fuel container to thereby generate electricity for charging said battery;

on said vehicle, applying alternating voltage, at an alternating voltage frequency, to a traction motor to thereby generate mechanical energy, whereby said traction motor generates waste heat in an amount dependent upon the efficiency of said traction motor;

applying said mechanical energy to drive said vehicle;

transferring heat from at least said traction motor to said passenger compartment;

on said vehicle, generating said alternating voltage by controllably converting direct voltage from said battery into an alternating voltage having said alternating voltage frequency by pulse-width-modulating a plurality of power switches at a pulse-width frequency which is greater than said alternating voltage frequency; and when more heat is needed from said traction motor to aid in heating said passenger compartment, adjusting said pulse-width frequency relative to said alternating voltage frequency in a manner which results in a direct current component through said traction motor, which decreases said efficiency of said traction motor in a manner which tends to increase the heat output of said traction motor.

4. A method for operating a hybrid electric vehicle having a passenger compartment, said method comprising the steps of:

providing a battery on said vehicle:

providing a fuel container on said vehicle;

on said vehicle, operating one of a fuel cell and an internal-combustion-engine/generator using fuel from said fuel container to thereby generate electricity for charging said battery;

on said vehicle, applying alternating voltage, at an alternating voltage frequency, to an ac induction traction motor, to thereby generate mechanical energy, whereby said traction motor generates waste heat in an amount dependent upon the efficiency of said traction motor;

applying said mechanical energy to drive said vehicle;

transferring heat from at least said ac induction traction motor to said passenger compartment;

on said vehicle, controllably converting direct voltage from said battery into said alternating voltage at said alternating voltage frequency; and when more heat is needed from said traction motor to aid in heating said passenger compartment, adjusting said alternating voltage frequency in a manner which results in a slip between the rotational frequency of said traction motor and said alternating voltage frequency, which decreases said efficiency of said traction motor by operating said traction motor in a manner which tends to increase the heat output of said traction motor.

* * * * *